United States Patent
Brown et al.

[11] Patent Number: 5,878,164
[45] Date of Patent: Mar. 2, 1999

[54] INTERLEAVED SEGMENTAL METHOD FOR HANDWRITING RECOGNITION

[75] Inventors: Michael Kenneth Brown, N. Plainfield; Jianying Hu, Westfield; William Turin, E. Brunswick, all of N.J.

[73] Assignee: Lucent Technologies Inc., Murray Hill, N.J.

[21] Appl. No.: 946,876

[22] Filed: Oct. 8, 1997

Related U.S. Application Data

[63] Continuation of Ser. No. 543,568, Oct. 16, 1995, abandoned, which is a continuation-in-part of Ser. No. 290,623, Aug. 15, 1994, Pat. No. 5,559,897, which is a continuation-in-part of Ser. No. 184,811, Jan. 21, 1994, Pat. No. 5,699,456.

[51] Int. Cl.$^6$ ........................................ G06K 9/00
[52] U.S. Cl. ............................. 382/190; 382/224
[58] Field of Search .................... 382/155, 156, 382/157, 158, 159, 160, 161, 173, 176, 177, 178, 179, 193, 217, 224, 225, 226, 227, 228, 229, 230, 231, 312, 313, 314, 315, 301, 317, 321, 216, 218, 290, 181, 182, 200, 183, 184, 201, 185, 186, 202, 187, 188, 207, 189, 190, 209, 191, 192, 208, 194, 195, 204, 197, 198, 199, 203; 395/3, 10, 50, 20, 21, 60

[56] References Cited

U.S. PATENT DOCUMENTS

| | | | |
|---|---|---|---|
| 4,933,977 | 6/1990 | Ohnishi et al. | 382/204 |
| 5,029,223 | 7/1991 | Fujisaki | 382/13 |
| 5,038,382 | 8/1991 | Lipscomb | 382/13 |
| 5,121,441 | 6/1992 | Chefalas et al. | 382/13 |
| 5,129,012 | 7/1992 | Abe | 382/204 |

OTHER PUBLICATIONS

Jianying Hu, et al., Invariant Features for HMM Based On–Line Handwriting Recognition; To appear, 8th Int. Conf. on Image Analysis and Processing, Sep. 13–15, Sanremo, Italy 1995. (no page #.).

Jin–Young Ha, et al., Unconstrained Handwritten Word Recognition with Interconnected Hidden Markov Models; IWFHR III, 1993, pp. 455–461. (no place of public.).

S. Bercu, et al., On–Line Handwritten Word Recognition; An Approach Based on Hidden Markov Models; IWFHR III, 1993, pp. 385–391. (no place of public.).

R. Nag, et al., Script Recognition Using Hidden Markov Models; ICASSP, Tokyo 1986. (no page # & place of public.).

Amlan Kundu, et al., Recognition of Handwritten Script: A Hidden Markov Model Based Approach; ICASSP, vol. 2, Apr. 1988, pp. 928–931. (no place of public.).

Jianying Hu, et al.,; Handwriting Recognition With Hidden Markov Models and Grammatical Constraints; IWFHR IV, 1994, pp. 195–205: (no place of public.).

*Primary Examiner*—Leo H Boudreau
*Assistant Examiner*—Bijan Tadayon

[57] ABSTRACT

A method of handwriting recognition is provided that combines the efficiency of a point oriented system and the shape information of a segment oriented system in an HMM based handwriting recognition system. The partial segmentation hypotheses obtained using the point oriented features in a conventional Viterbi search are augmented with scores based on segmental shape measurements made on the hypothesized segments. In addition, a method for segmentation of a handwriting sample is accomplished by incorporating a feature to distinguish between continuous and not continuous strokes and influencing the indicated hypothesis score by adding a penalty to the contraindicated hypothesis score.

10 Claims, 2 Drawing Sheets

1 - LIGATURE
2 - LETTER "l"
3 - LIGATURE
4 - LETTER "i"
5 - LIGATURE
6 - LETTER "n"
7 - LIGATURE
8 - LETTER "e"
9 - LIGATURE
10 - DELAYED STROKE "DOT"

INPUT:
    COORDINATE SEQUENCE < $(x_1, y_1)$, $(x_2, y_2)$, ..., $(x_m, y_m)$ >
    TARGET LENGTH n

OUTPUT:
    COORDINATE SEQUENCE < $(x'_1, y'_1)$, $(x'_2, y'_2)$, ..., $(x'_m, y'_m)$ >

BEGIN:
```
    x'1 = x1;  y'1 = y1;
    x'n = xm;  y'n = ym;
    r = (float) m/n;
    for (2 ≤ i ≤ n-1) do {
        t = i·r;
        j = (floor) t;
        t = t-j;
        x'i = (xj+1-xj);
        y'i = (yj+1-yj)·t+yj;
    }
END
```

1 – LIGATURE
2 – LETTER "n"
3 – LIGATURE
4 – LETTER "r"
5 – LETTER "c"
6 – LIGATURE

1 – LIGATURE
2 – LETTER "l"
3 – LIGATURE
4 – LETTER "i"
5 – LIGATURE
6 – LETTER "n"
7 – LIGATURE
8 – LETTER "e"
9 – LIGATURE
10 – DELAYED STROKE "DOT"

INTERLEAVED SEGMENTAL METHOD FOR HANDWRITING RECOGNITION

CROSS REFERENCE TO RELATED APPLICATIONS

This application is a continuation of application Ser. No. 08/543,568, filed Oct. 16, 1995, now abandoned, which is is a continuation in part of application Ser. No. 08/290,623, filed Aug. 15, 1994, U.S. Pat. No. 5,559,897, issued on Sep. 24, 1996, entitled, "Methods and Systems for Performing Handwriting Recognition," which is itself a continuation in part of U.S. patent application Ser. No. 08/184,811, filed Jan. 21, 1994, entitled, "Large Vocabulary Connected Speech Recognition System and Method of Language Representation Using Evolutional Grammar to Represent Context Free Grammars," now U.S. Pat. No. 5,699,456, the disclosures of which are incorporated herein by reference as if fully set forth herein.

FIELD OF THE INVENTION

The present invention relates generally to methods for handwriting recognition and to selecting and implementing one or more appropriate features to represent a handwritten sample upon which to operate.

BACKGROUND OF THE INVENTION

In a typical Hidden Markov Model (HMM) based recognition system, an input pattern such as a handwritten word, is represented as a time-ordered sequence of observations, usually in the form of feature vectors. Observation probabilities derived from these feature vectors are presented to a network of HMM states. Various methods can then be applied to find either the optimal state sequence or the most likely model for the given observation sequence, thus providing the recognition result.

Stochastic pattern recognizers, such as Hidden Markov Model (HMM) based recognizers are typically point oriented in that the observations are often localized in nature. For example, observations for sampled on-line handwriting might include point positions, interpoint vector orientation such as stroke tangents and curvature. All of these features can, in principle, be measured by looking at one, two, or three handwriting data points, although in practice, the smoothing filters used to reduce noise, require additional local data points to support each measurement. For each new sample data point, taken in chronological sequence, the HMM hypotheses scores are discretely integrated and propagated through the HMM network.

Alternatively, stochastic pattern recognizers can be segment oriented. A segmental feature is a measurement of some characteristic of a contiguous collection of sample points as for example by a sliding window measurement, or as further described below by applying segmental features selected through point based features. In this design, a script is first segmented into letters or subcharacter primitives according to defined boundary conditions such as pen-ups and cusps, as further described below. After the segmentation step a single observation feature vector is computed for each segment.

Point oriented methods avoid actually generating all possible segmentations by simultaneous scoring of all hypotheses and immediate pruning of poorly scored partial hypotheses. Consequently, all possible segmentations and identifications of the input pattern are considered in an efficient manner. However, since point oriented methods only utilize local observation measurements, the system does not consider the shape of the sample, which can only be observed from larger scale measurements.

One method for obtaining shape information in a point oriented system is to extract features from a window of fixed or variable size around each sample point. This method, however, does not adapt to the varying characteristics of pattern shapes, sizes, and segmentation boundaries.

Systems using segment oriented methods obtain greater accuracy by integrating observations over larger regions, but operate less efficiently than point oriented methods. Unlike point oriented systems where each point is analyzed independently, many alternate segments in a segment oriented system can be modelled for a given set of sample points. To generate all segmentations and compute all possible hypothesis scores is an intractable task, thus, impractical.

SUMMARY OF THE INVENTION

In accordance with the present invention, there is provided an improved segment oriented method, or interleaved segmental method, in a handwriting recognition system, that ameliorates the tradeoff between efficiency and accuracy. Point oriented methods are used to obtain partial segmentation hypotheses. Shape information, which is only available through segmental modelling, is retained by modelling these selected segments, while the inefficiency of modeling all possible segments is avoided.

A new method is also provided to improve handwriting recognition by proper segmentation of a handwriting sample. A gap feature is defined to distinguish a spatial distance between successive strokes greater than a threshold value, from a spatial distance between successive strokes less than the threshold value. Where the spatial distance is greater than the threshold value the alternative accumulated hypothesis scores are biased toward those scores indicating that the two successive strokes are discontinuous, by adding a penalty score to those alternative hypothesis scores indicating a continuous stroke. Where the spatial distance is less than the threshold value, the alternative hypothesis scores are biased towards two discontinuous strokes, by adding a penalty to those alternative hypothesis scores indicating that the two successive strokes are continuous.

DETAILED DESCRIPTION OF THE INVENTION

An HMM based handwriting recognition system, which uses only local features, is composed of stroke models embedded in an evolutional grammar network representing a vocabulary. Each arc in the grammar network corresponds to a letter model representing a unique letter pattern class. Each letter model is composed of a sequence of a variable number of stroke models as specified in a lexicon and each stroke model is implemented as a single state HMM. These stroke models are referred to as nebulous stroke models and are more fully explained in Jianying Hu, et al., *Handwriting Recognition with Hidden Markov Models and Grammatical Constraints, in,* Fourth International Workshop on Frontiers in Handwriting Recognition (December 1994), incorporated by reference as if fully set forth herein. Delayed strokes are considered special one-stroke letters. Each letter typically requires more than one letter model representing different letter pattern classes as a result of different writing styles.

Figures 1, 2:
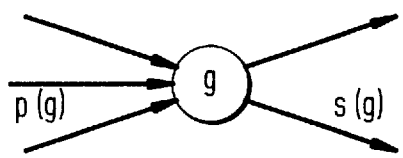
FIG. 1 depicts a typical grammar node as found in an evolutional grammar network, with preceding arcs p(g) and succeeding arcs s(g).
FIG. 2 shows an algorithm written in pseudo code, of a resampling procedure for computing the normalized instance vector of a fixed length for any segment of arbitrary length.

Referring to FIG. 1, g is a typical grammar node with a number of incoming arcs p(g), representing the preceding letter pattern classes and a number of outgoing arcs s(g), representing the succeeding letter pattern classes. Each letter pattern class l, is modelled by a single HMM, denoted by m(l). The initial state of the model is denoted by h(l) and the final state is denoted by f(l). For any state i, $q_i(t)$ denotes the state sequence (hypothesis) selected by a Viterbi algorithm leading to i at sample point t, and $\delta_i(t)$ denotes the accumulated likelihood score of that hypothesis. O represents the observation at sample point t, and $\Delta_i(O_t)$ represents the log-likelihood score of $O_t$ in state i.

At each sample point t during the Viterbi search, the maximum of all the accumulated scores at the final states of the preceding letter models, in other words, the incoming score, is found and propagated to the initial state of each of the succeeding models, along with the corresponding state sequence. By augmenting the incoming point scores at each grammar node with the segmental letter matching scores, the overall shapes of letters are taken into consideration when the hypotheses leading to the grammar node are ranked, and the highest rank is selected and propagated to the succeeding letter models. Through this mechanism, segmental letter matching scores computed on dynamically allocated, temporary, segments directly affects the decision making at each point during the Viterbi search, so that the system is biased towards sequences with better matches at the letter level.

In one preferred embodiment, the operation is carried out as follows:

$$k = argmax_{l \in p(g)} \delta_{f(l)}(t-1)$$

For each state j=h(l); l ∈ s(g):

$$q_j(t) = \begin{cases} q_{f(k)}(t-1),j & \text{if } \delta_{f(k)}(t-1) > \delta_j(t-1) \\ q_j(t-1),j & \text{otherwise} \end{cases}$$

$$\delta_j(t) = \begin{cases} \delta_{f(k)}(t-1) + \Delta_j(O_t) & \text{if } \delta_{f(k)}(t-1) > \delta_j(t-1) \\ \delta_j(t-1) + \Delta_j(O_t) & \text{otherwise} \end{cases}$$

To incorporate segmental shape information into the search, where the letter is the segment, the incoming scores are augmented with segmental letter matching scores, computed using global letter shape models. More specifically, let $\alpha_l(t_1, t_2)$ be the likelihood score of the segment from sample point $t_1$ to $t_2$ on the observation sequence being matched to letter pattern class l, the augmented incoming scores are defined as:

$$\delta'_{f(l)}(t-1) = \delta_{f(l)}(t-1) + \alpha_l(t_1, t-1)$$

where $t_l = t - d_{m(l)}(f(l), t-1)$ and $d_{m(l)}(f(l), t-1)$ is the number of sample points assigned to letter model m(l) up to state f(l) at sample point t−1. With these augmented scores, the previous operation at grammar node g is replaced by the following:

$$k = argmax_{l \in p(g)} \delta'_{f(l)}(t-1)$$

For each state j=h(l); l ∈ s(g):

$$q_j(t) = \begin{cases} q_{f(k)}(t-1),j & \text{if } \delta'_{f(k)}(t-1) > \delta_j(t-1) \\ q_j(t-1),j & \text{otherwise} \end{cases}$$

$$\delta_j(t) = \begin{cases} \delta'_{f(k)}(t-1) + \Delta_j(O_t) & \text{if } \delta'_{f(k)}(t-1) > \delta_j(t-1) \\ \delta_j(t-1) + \Delta_j(O_t) & \text{otherwise} \end{cases}$$

This mechanism can be easily modified to incorporate segmental matching scores at the stroke level as well. However, since individual strokes have mostly very simple shape characteristics, little shape information is obtained by augmenting the scores at this level.

In HMM systems of the prior art, the optimal state sequence is computed according to the Viterbi algorithm familiar to those skilled in the art. The Viterbi algorithm optimizes modelling of the observed state sequence by calculating the maximum probability of being in a particular state at any point in time and calculating the maximum probability of a transition between preceding and succeeding states. However, since the accumulated score computed by the method of the present invention incorporates not only the transition probability from the preceding to succeeding states, but also information reflected in the letter duration regarding how the previous state was reached, the optimality is no longer guaranteed. Nonetheless, the results obtained with an augmented HMM system according to the present invention are better than those obtained with the prior art HMM system even with optimal state sequence.

Given the boundary points of a curve segment, many different metrics can be used to measure how well the curve segment matches a certain known pattern. Metrics can be based on various moment features, or other global features, for example, total angle change and presence of a loop. However, each of these metrics typically captures one characteristic of the global shape of the segment, therefore, many of them usually have to be used together to provide a sufficient description of the segment. Alternatively, a single correlation based metric can be used. In one preferred embodiment, the present invention is implemented with an inter-segmental distance measure correlation metric adapted from a similar metric used for isolated symbol recognition, which is disclosed in "Method of Recognizing Handwritten Symbols," U.S. Pat. No. 5,333,209, Jul. 26, 1994, the teachings of which are incorporated as if fully set forth herein. This metric is chosen for its simplicity in both concept and computation, and its relative completeness in representing the shape of the whole segment.

Given a segment a with coordinate sequence $\eta_a = <(x_1, y_1), (x_2, y_2), \ldots, (x_n, y_n)>$, the centroid of a is defined as:

$$z_a = \left[ \frac{1}{n} \sum_{i=1}^{n} x_i, \frac{1}{n} \sum_{i=1}^{n} y_i \right] = (x_a, y_a)$$

The instance vector of a is defined as:

$$v_a = (\bar{x}_1, \bar{y}_1, \bar{x}_2, \bar{y}_2, \ldots, \bar{x}_n, \bar{y}_n), \bar{x}_i = x_i - x_a, \bar{y}_i = y_i - y_a \text{ for } 1 \leq i \leq n$$

The normalized instance vector of a is defined as:

$$u_a = \frac{v_a}{|v_a|}$$

$u_a$ is a translation and scale independent representation of segment a in $R^{2n}$. Through a resampling procedure, discussed more fully below, such a representation can be computed for a segment of arbitrary length. In other words, any sample segment can be mapped to a vector in $R^{2n}$.

Based on this representation, the distance between two sample segments is defined as:

$$D(a,b) = 0.5(1 - u_a \cdot u_b)$$

Distance $D(a,b)$ can be interpreted as a measure of shape similarity between segments a and b ranging from identical ($u_a \cdot u_b = 1$; $D(a,b) = 0$) to entirely different ($u_a \cdot u_b = -1$; $D(a,b) = 1$).

With this shape similarity measure, the segmental matching score used in the augmented HMM system of the present invention, $\alpha_l(t_1, t_2)$, is defined as: $\alpha_l(t_1, t_2) = -w_\alpha D(a_l, a_{t_1 t_2})$, where $a_l$ is the model segment for letter pattern l, $a_{t_1 t_2}$ is the segment from sample point $t_1$ to $t_2$, on the input sample sequence and $w_\alpha$ is a weight factor. The segmental matching score ranges from $-w_\alpha$ to 0, with higher score indicating a better match. Alternatively, this score can be interpreted as the likelihood of segment $a_{t_1 t_2}$ being a member of letter pattern class l, if we assume that the probability density of $D(a_1,a); a \in 1$ is a monotonically increasing function of $-D(a_1, a)$.

To compute the above segment matching score, each letter pattern class must have a corresponding single model segment. Let $u_1, u_2, \ldots, u_N$ be the normalized instance vectors of a set of prototypes for the letter pattern class l. A single model segment representing this class is represented by vector w which minimizes the sum of distances from individual prototypes, which is the vector maximizing the sum $$F(w) = \sum_{i=1}^{N} u_i \cdot w = \left( \sum_{i=1}^{N} u_i \right) \cdot w$$

Since, vector w must be colinear to $\Sigma^N_{i=1} u_i$ and $|w|=1$, the solution has the form $$w = \frac{\sum_{i=1}^{N} u_i}{\left| \sum_{i=1}^{N} u_i \right|}$$

Since a sample segment and a given model segment do not necessarily contain the same number of points, a resampling procedure is needed to compute the normalized instance vector of a fixed length for any segment of arbitrary length. Since this procedure is called every time a segmental matching score is computed, one efficient method of resampling includes equal distance resampling with linear interpolation. In one preferred embodiment, the input sequence is resampled during preprocessing, so calculating the actual distance can be avoided in the resampling procedure performed for segmental matching.

Since a sample segment does not necessarily contain the same number of points as the model segment that it is being compared to a resampling procedure is needed.

The resampling algorithm takes a coordinate sequence of arbitrary length and converts it into a coordinate sequence of given length n. If the input sequence is uniform then the output sequence is also uniform. FIG. 2 shows a preferred resampling algorithm written in pseudo code.

A pen-up refers to the situation when the pen is lifted from a pad during writing. Although a pen-up by itself is not a reliable criterion for segmentation since its occurrence within a handwritten word is highly writer dependent, there are some general rules regarding pen-up's that could be used to assist segmentation and recognition. For example, a delayed stroke is usually preceded by a pen-up, while the main body of a letter is usually not interrupted by pen-up's. Missegmentation or misclassification could occur when these facts are not considered. Furthermore, when segmental matching scores are used, the mistakes on segmentation during training directly affect the reliability of the resulting model segments for the letter patterns, which could in turn cause more recognition errors.

In order to incorporate pen-up information into a handwriting recognition system, a feature called gap, is defined, which is related to but more reliable than pen-up. A gap occurs if there is a pen-up and the distance between the pen-lift point, the beginning of the pen-up and the following pen-down point, the end of the pen-up, is equal to or greater than a gap threshold value. One preferred threshold value is 0.05 millimeters. A gap feature signal can be used to indicate whether a gap is present. In one preferred embodiment, the gap feature signal is a binary variable g(t), which can be computed during preprocessing for each point in the time ordered sequence. g(t)=1 indicates a gap, while g(t)=0 indicates no gap.

Let $S = s_1 s_2 \ldots s_{t-1}, s_t, \ldots s_n$ represent a state sequence hypothesis where $s_t$ is the state corresponding to sample point t. Hypothesis S enters state $s_t$ at point t if $s_t \neq s_{t-1}$, otherwise, it stays in the same state at point t. If g(t)=1, then a hypothesis that stays in the same state at point t is penalized by adding a negative constant $P_g$, a gap penalty, to its accumulated score. On the other hand, if g(t)=0, then a hypothesis that enters at point t the state representing a delayed stroke is penalized by the addition of a negative constant $P_c$, a continuous penalty, to its accumulated score. By incorporating these two penalties, each stroke segment in the final hypothesis chosen by the Viterbi algorithm, tends to contain a continuous curve and each delayed stroke segment tends to start immediately following a gap.

In one possible implementation, segment matching scores are not applied during training. The model segment for each letter pattern class is computed once using the segmentations obtained at the end of the training procedure. To be more specific, during the final iteration of the segmental iterative training at the whole word level, all training word samples are segmented and labeled according to the final HMM parameters. These samples are then scanned and all sample segments corresponding to the same letter pattern class are collected as prototypes, from which the model segment for the class is computed. In a more sophisticated implementation, initial model segments can be computed from isolated letter samples before the iterative training procedure starts, and then applied and updated at each iteration during training.

Figure 3:
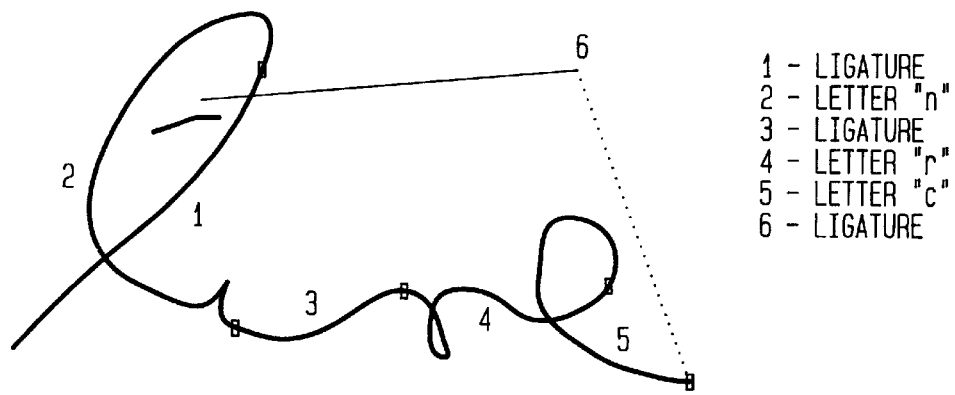
FIG. 3 illustrates the misrecognition of a sample word "line" by a precursor handwriting recognition system that does not incorporate the present invention.
Figure 4:
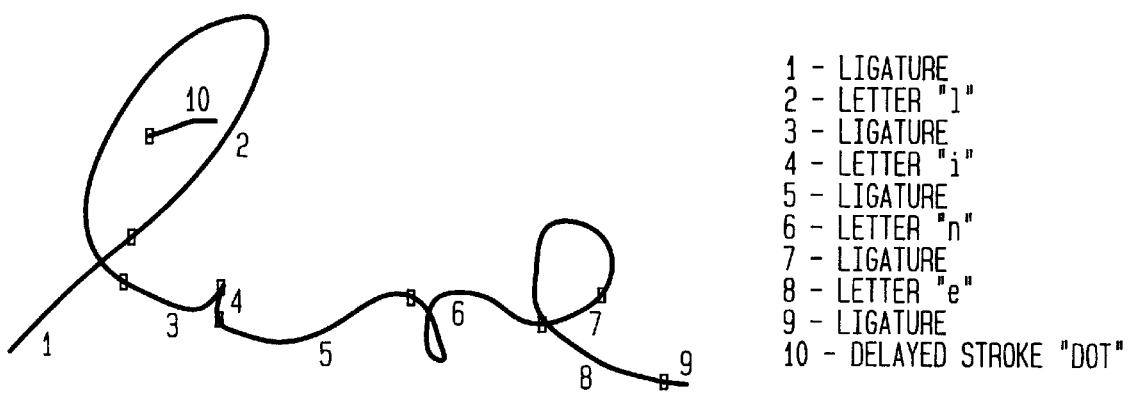
FIG. 4 illustrates the results of a handwriting recognition system according to the present invention of the same sample word shown in FIG. 3.

FIGS. 3 and 4 illustrate the effect of applying letter matching scores in the HMM system by comparing the different letter level segmentations obtained with and without letter matching scores. FIG. 3 shows the segmentation of a sample of word "line" when the basic HMM system was used and the sample was falsely recognized as "arc". It shows how such an error is probable when global letter shape information is missing from the system. It also demonstrates an "unreasonable" segmentation (the last segment), with a gap in the middle of a ligature (a one-stroke letter), caused by the lack of pen-up information.

FIG. 4 shows the segmentation of the same sample when letter matching scores are applied and the sample is correctly recognized. The hypothesis shown in FIG. 3 is no longer selected because the segment corresponding to letter "a" does not match the corresponding model segment well and therefore yields a poor letter matching score.

The foregoing merely illustrates the principles of the present invention. Those skilled in the art will be able to devise various modifications, which although not explicitly described or shown herein, embody the principles of the invention and are thus within its spirit and scope.

What is claimed is:

1. An improved method for performing handwriting recognition of a handwriting sample represented by a signal sequence, utilizing one or more point oriented feature signals to hypothesize a segment of said handwriting sample giving rise to a point oriented hypotheses score wherein the improvement comprises the steps of:

generating one or more segmental feature signals of said segment of said handwriting sample giving rise to a segmental hypothesis score;

augmenting said point oriented hypothesis score with a segmental matching score computed using said segmental hypothesis score; and recognizing said handwriting sample based on said augmented point oriented hypothesis score.

2. A method according to claim 1 wherein said handwriting recognition system is a Hidden Markov Model based handwriting recognition system.

3. A method according to claim 1 wherein one of said segmental feature signals is based on an inter-segmental distance measure correlation metric.

4. A method according to claim 3 further comprising the step of:

preprocessing said handwriting sample so that it contains a predetermined number of points.

5. An improved method for recognizing a handwriting sample on the basis of a set of alternative hypothesis scores, said alternative hypothesis scores being accumulated at each of a set of selected hypothesis scoring points falling within said handwriting sample, each alternative hypothesis score of said set of alternative hypothesis scores representing a likelihood indication of an alternate model of said handwriting sample, said handwriting sample having one or more pen-up instances, each pen-up instance having associated therewith a spatial distance between a pen-lift point and a pen down point, said set of selected hypothesis scoring points including said pen-lift points and said pen down points, the improvement comprising the steps of:

detecting each of said pen-up instances within said handwriting sample;

calculating said spatial distance associated with each of said pen-up instances, respectively;

associating with each of said pen-up instances a predetermined gap feature signal indicative of whether said spatial distances are at least equal to, or less than, a predetermined gap threshold spatial distance value;

adjusting said set of accumulated hypothesis scores by adding a predetermined penalty to each of said accumulated hypothesis scores of said set of alternative hypothesis scores corresponding to said pen down point, indicating a model of said handwriting sample continuous between said pen lift point and said pen down point, where said predetermined gap feature signal indicates a spatial distance equal to or greater than said threshold value and by adding a predetermined penalty to each of said accumulated hypothesis scores of said set of alternative hypothesis scores corresponding to said pen down point, indicating a model of said handwriting sample not continuous between said pen lift point and said pen down point, where said predetermined gap feature signal indicates a spatial distance less than said gap threshold value; and recognizing said handwriting sample based on said adjusted alternative hypothesis scores.

6. A method according to claim 5 wherein said predetermined gap feature signal is a binary feature signal.

7. A method according to claim 5 wherein said handwriting recognition system is a Hidden Markov Model based handwriting recognition system.

8. An apparatus for performing handwriting recognition of a handwriting sample represented by a signal sequence, utilizing point oriented feature signals to hypothesize a segment of said handwriting sample giving rise to a point oriented hypothesis score, the improvement comprising:

means for generating one or more segmental feature signals of said segment of said handwriting sample giving rise to a segmental hypothesis score;

means for augmenting said point oriented hypothesis score with a segmental matching score computed using said segmental hypothesis score; and means for recognizing said handwriting sample based on said augmented point oriented hypothesis score.

9. A method for performing handwriting recognition of a handwriting sample comprising a string of interconnected symbols represented by a signal sequence, comprising the steps of:

utilizing one or more point oriented feature signals to hypothesize one or more segmentations of said string of interconnected symbols, each of said hypothesized segmentations having associated therewith a point oriented hypothesis score;

generating one or more segmental feature signals of each of said hypothesized segmentations giving rise to a segmental hypothesis score for each of said hypothesized segmentations;

respectively adding to said point oriented hypothesis score of each of said hypothesized segmentations a segmental matching score computed using said segmental hypothesis score of each of said hypothesized segmentations, resulting in an augmented hypothesis score for each of said hypothesized segments; and recognizing said handwriting sample based on said augmented hypothesis score.

10. An apparatus for performing handwriting recognition of a handwriting sample comprising a string of interconnected symbols represented by a signal sequence, comprising:

means for hypothesizing one or more segmentations of said string of interconnected symbols utilizing one or more point oriented feature signals and generating a point oriented hypothesis score for each of said hypothesized segmentations;

means for generating one or more segmental feature signals of each of said hypothesized segmentations giving rise to a segmental hypothesis score for each of said hypothesized segments;

means for respectively adding to said point oriented hypothesis score for each of said hypothesized segmentations a segmental matching score computed using said segmental hypothesis score for each of said hypothesized segmentations resulting in an augmented hypothesis score for each of said hypothesized segmentations; and means for recognizing said handwriting sample based on said augmented hypothesis score.

\* \* \* \* \*